United States Patent
Aldred

(10) Patent No.: US 7,053,580 B2
(45) Date of Patent: May 30, 2006

(54) AUTONOMOUS MACHINE

(75) Inventor: Michael David Aldred, Chippenham (GB)

(73) Assignee: Dyson Limited, Wiltshire (GB)

( * ) Notice: Subject to any disclaimer, the term of this patent is extended or adjusted under 35 U.S.C. 154(b) by 0 days.

(21) Appl. No.: 10/494,299

(22) PCT Filed: Oct. 31, 2002

(86) PCT No.: PCT/GB02/04960

§ 371 (c)(1),
(2), (4) Date: Oct. 25, 2004

(87) PCT Pub. No.: WO03/039314

PCT Pub. Date: May 15, 2003

(65) Prior Publication Data

US 2005/0046373 A1    Mar. 3, 2005

(30) Foreign Application Priority Data

Nov. 3, 2001  (GB) ................................. 0126499.3

(51) Int. Cl.
*G05D 1/00* (2006.01)
(52) U.S. Cl. ...................... 318/580; 318/581; 318/582; 318/587; 318/640; 701/1; 701/2; 701/22; 701/25; 701/200; 701/223; 701/301
(58) Field of Classification Search ........ 318/580–589, 318/640
See application file for complete search history.

(56) References Cited

U.S. PATENT DOCUMENTS

| | | | |
|---|---|---|---|
| 6,255,793 B1 * | 7/2001 | Peless et al. ................. | 318/580 |
| 6,314,341 B1 * | 11/2001 | Kanayama ..................... | 701/1 |
| 6,907,336 B1 * | 6/2005 | Gray et al. .................... | 701/50 |
| 2004/0193348 A1 * | 9/2004 | Gray et al. .................... | 701/50 |
| 2005/0075785 A1 * | 4/2005 | Gray et al. ................. | 701/202 |
| 2005/0085947 A1 * | 4/2005 | Aldred et al. ............... | 700/253 |

FOREIGN PATENT DOCUMENTS

| | | |
|---|---|---|
| GB | 2 124 798 | 2/1984 |
| GB | 2 344 900 | 6/2000 |
| WO | WO 00/38029 | 6/2000 |

\* cited by examiner

*Primary Examiner*—Rina Duda
*Assistant Examiner*—Erick Glass
(74) *Attorney, Agent, or Firm*—Morrison & Foerster LLP

(57) ABSTRACT

An autonomous machine comprises driving means for moving the machine along a surface of an area, and a navigation system. The navigation system causes the machine to follow a boundary of the area, storing path information on the path travelled by the machine as the machine follows the boundary and compares when the machine has returned to a previously visited position in the area. The navigation system compares the latest section of the path travelled by the machine with information representing a section of the path previously stored in the memory and decides when the new path information and previously stored path information are substantially the same.

21 Claims, 13 Drawing Sheets

DOMINANT ORIENTATION

INTERNAL        EXTERNAL

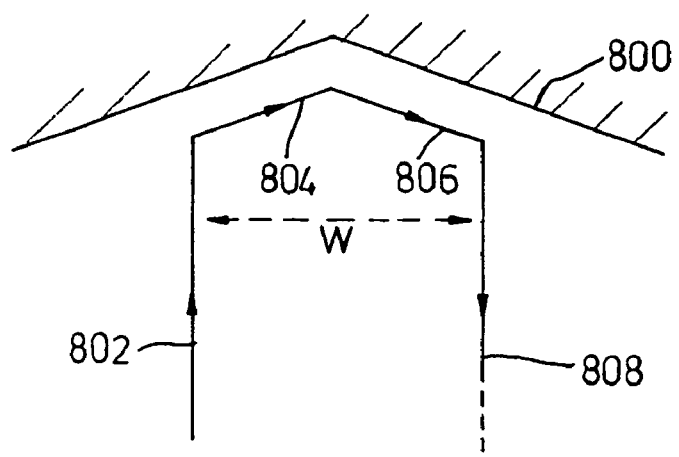
Fig. 18
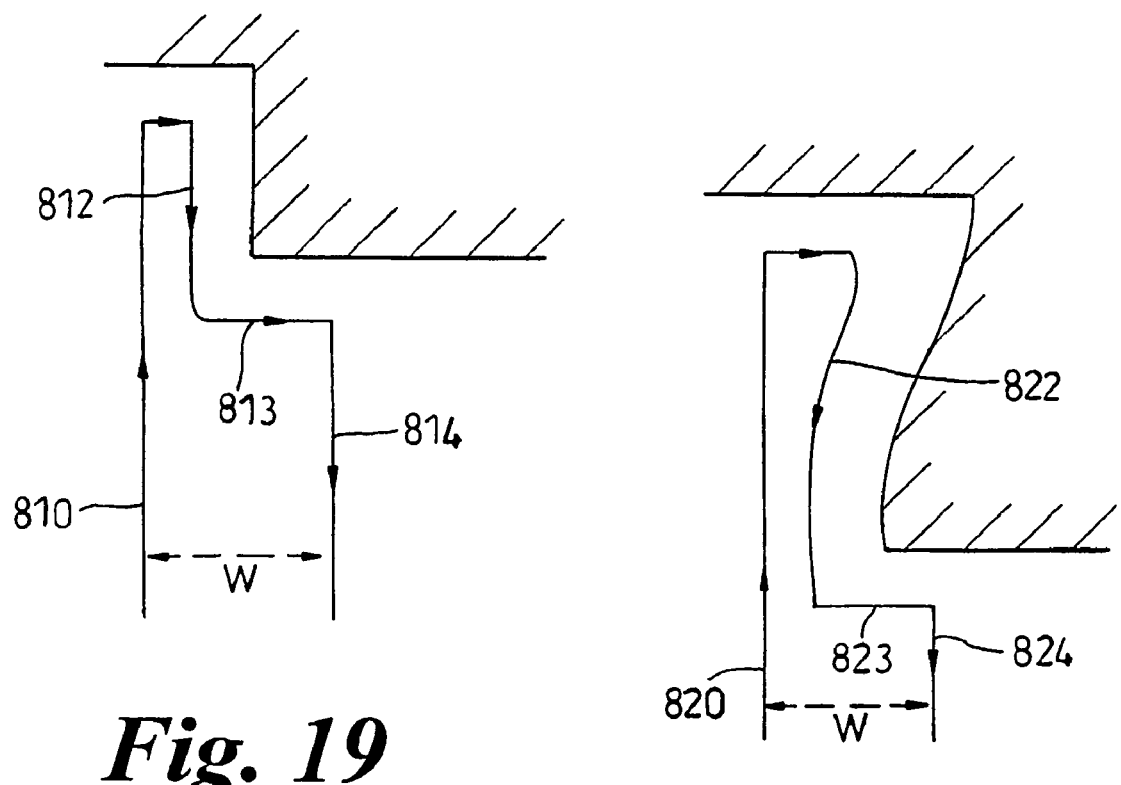
Fig. 19
Fig. 20

AUTONOMOUS MACHINE

This invention relates to an autonomous machine, such as an autonomous machine for cleaning a floor area.

There have been various proposals to provide autonomous or robotic machines for performing duties such as cleaning or polishing a floor area or for mowing grass. In their simplest form, an autonomous machine requires a training phase during which the machine is manually led around the area in which it is to work. Following this training phase, the autonomous machine will then perform the required work as it follows the path which it stored in its memory during the training phase. Other machines may simply follow a predetermined route which is marked by means such as a cable which is buried beneath the working area.

Other autonomous machines are supplied with a map of the environment in which they are to be used. The machine then uses this map to plan a route around the environment.

There have also been proposals for autonomous machines which are capable of exploring the environment in which they are placed without human supervision, and without advance knowledge of the layout of the environment. The machine may explore the environment during a learning phase and will subsequently use this information during a working phase. An autonomous machine shown in WO 00/38025 initially travels around the perimeter of an area, recognises when it has completed a single lap of the area, and then steps inwardly after that and subsequent laps of the room so as to cover the area in a spiral-like pattern. Autonomous machines are known to build a map of the working area using the information they acquire during the learning phase. Autonomous machines of this last type are particularly attractive to users as they can be left to work with minimal human supervision.

Autonomous machines usually have some form of odometry system for measuring the distance and direction travelled by the machine. Distance and direction information can be derived from sensors which monitor movement of each of the wheels. The machine uses the odometry information to deduce how far it has travelled since a starting position in the working area, and thus where it currently is located within the area. Unfortunately, relying on odometry information alone is unreliable as errors can quickly accumulate, and this can eventually lead to a complete disorientation of the machine. For example, if one of the drive wheels of the machine slips on the floor surface the odometry system will record a movement, since the wheel has turned, whereas, due to the wheel slippage, the machine does not actually move across the surface. Poor odometry information results in a difference between the calculated position of the machine and the actual position of the machine. In a floor cleaning machine this could result in the machine not travelling across some areas of the floor surface, which would remain dirty, or the machine becoming lost.

Odometry information can be supplemented, or replaced entirely, by other information. A paper entitled "Gyrodometry: A New Method for Combining Data from Gyros and Odometry in Mobile Robots" presented at the 1996 IEEE International Conference on Robotics and Automation, Minneapolis, Apr. 22–28, 1996, pp. 423–428, describes a proposal for reducing the problems of odometry-based robots in which the odometry data is substituted by gyro data during the short periods when odometry data is unreliable. Some systems position navigation beacons around an area such that the machine can calculate its position by a process of triangulating information received from a number of beacons. However, this has the obvious disadvantage of requiring beacons to be positioned around each area where the machine will work, and the associated cost of these beacons. U.S. Pat. No. 6,255,793 describes a system of this type where the boundary of the working area is defined by markers. One of the ways in which the calculated location of the autonomous machine can be corrected is by detecting the presence of markers which each have a unique identity.

The present invention seeks to provide an improved autonomous machine.

A first aspect of the present invention provides an autonomous machine comprising:
   driving means for moving the machine along a surface of an area, and
   a navigation system, including a memory means, for navigating the machine around the area, the navigation system comprising:
   boundary following means for causing the machine to follow a boundary of the area, storing path information on the path travelled by the machine as the machine follows the boundary;
   comparison means for determining when the machine has returned to a previously visited position in the area, the comparison means being arranged to compare the latest section of the path travelled by the machine with information representing a section of the path previously stored in the memory, and for deciding when the new path information and previously stored path information are substantially the same.

The machine makes use of the property that each area where the machine is used is likely to have an irregular shape, i.e. the shape of the area combined with the shape and position of obstacles within the area will give the boundary of the area a characteristic shape. A portion of the path taken by the machine in following the boundary will uniquely match only one position in the area. Thus, the machine can make use of this property of the environment as a form of navigation. This approach to navigation allows for a more modest sensor and processing requirement than feature based navigation systems, and therefore is easier and cheaper to implement. It also saves user effort in installing navigation beacons in the working area.

The boundary can take many forms. In a room of a building, the boundary will be the walls of the room and the boundaries of objects placed within the room such as items of furniture. In an outdoor area, the boundary may be a pre-existing barrier such as a fence or wall or it may be any form of barrier which is positioned especially for use with the autonomous machine.

The ability of an autonomous machine to recognise when it has returned to a previously visited position has many uses. It allows the machine to determine when it has completed a single lap of the perimeter of an area When a machine is set to work in an unknown area, this is a fundamental requirement of the machine. Also, it can be used to reset odometry errors. As previously described, the accuracy of the position determination of an autonomous machine relying on odometry gradually deteriorates over a period of time. Recognising a previously visited position within an area allows the machine to reset the odometry error, since it has complete certainty of its position.

The navigation system can be implemented entirely in hardware, in software running on a processor, or a combination of these. Accordingly, a further aspect of the present invention provides software for operating the cleaning machine in the manner described herein. The software is conveniently stored on a machine-readable medium such as a memory device.

The autonomous machine can take many forms: it can be a robotic vacuum cleaner, floor polisher, lawn mower or a robotic machine which performs some other function. Alternatively, it could be a general purpose robotic vehicle which is capable of carrying or towing a work implement chosen by a user.

Embodiments of the present invention will now be described, by way of example only, with reference to the accompanying drawings, in which:

FIGS. 18–20 show scanning behaviours.

Figure 1:
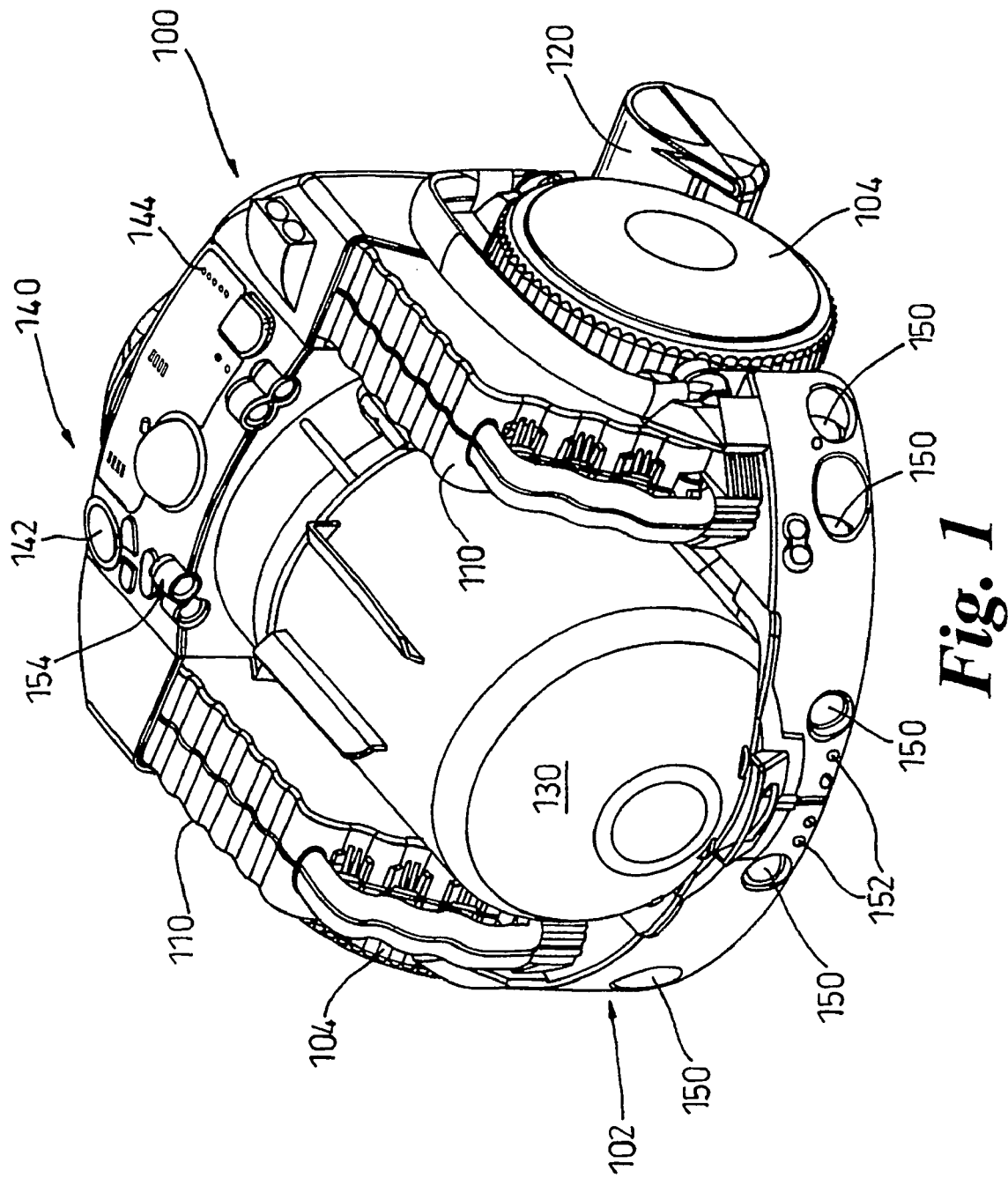
FIG. 1 shows an embodiment of an autonomous machine according to the invention.

FIG. 1 of the drawings shows a robotic, or autonomous, floor cleaning machine in the form of a robotic vacuum cleaner 100.

The cleaner comprises a main body or supporting chassis 102, two driven wheels 104, a brushbar housing 120, batteries 110, a dust separating and collecting apparatus 130, a user interface 140 and various sensors 150, 152, 154. The supporting chassis 102 is generally circular in shape and is supported on the two driven wheels 104 and a castor wheel (not shown). The driven wheels 104 are arranged at either end of a diameter of the chassis 102, the diameter lying perpendicular to the longitudinal axis of the cleaner 100. The driven wheels 104 are mounted independently of one another via support bearings (not shown) and each driven wheel 104 is connected directly to a traction motor which is capable of driving the respective wheel 104 in either a forward direction or a reverse direction. A full range of manoeuvres are possible by independently controlling each of the traction motors.

Mounted on the underside of the chassis 102 is a cleaner head 120 which includes a suction opening facing the surface on which the cleaner 100 is supported. A brush bar 122 (not shown) is rotatably mounted in the suction opening and a motor is mounted on the cleaner head 120 for driving the brush bar.

The chassis 102 carries a plurality of sensors 150, 152, 154 which are positioned on the chassis such that the navigation system of the cleaner can detect obstacles in the path of the cleaner 100 and the proximity of the cleaner to a wall or other boundary such as a piece of furniture. The sensors shown here comprise several ultrasonic sensors 150 which are capable of detecting walls and objects and several passive infra red (PIR) sensors which can detect the presence of humans, animals and heat sources such as a fire. However, the array of sensors can take many different forms. Position Sensitive Devices (PSDs) may be used instead of, or in addition to, the ultrasonic sensors. In an alternative embodiment the cleaner may navigate by mechanically sensing the boundary of the working area and boundaries of obstacles placed within the area. Each side of the vehicle carries an odometry wheel. This is a non-driven wheel which rotates as the machine moves along the surface. Each wheel has an optical encoder associated with it for monitoring the rotation of the odometry wheel. By examining the information received from each odometry wheel, the navigation system can determine both the distance travelled by the machine and the change in angular direction of the machine. It is preferred that the odometry wheel is a non-driven wheel as this increases the accuracy of the information obtained from the wheel. However, a simpler embodiment of the machine can derive odometry information directly from one of the driven wheels.

The vacuum cleaner 100 also includes a motor and fan unit supported on the chassis 102 for drawing dirty air into the vacuum cleaner 100 via the suction opening in the cleaner head 120.

Figure 2:
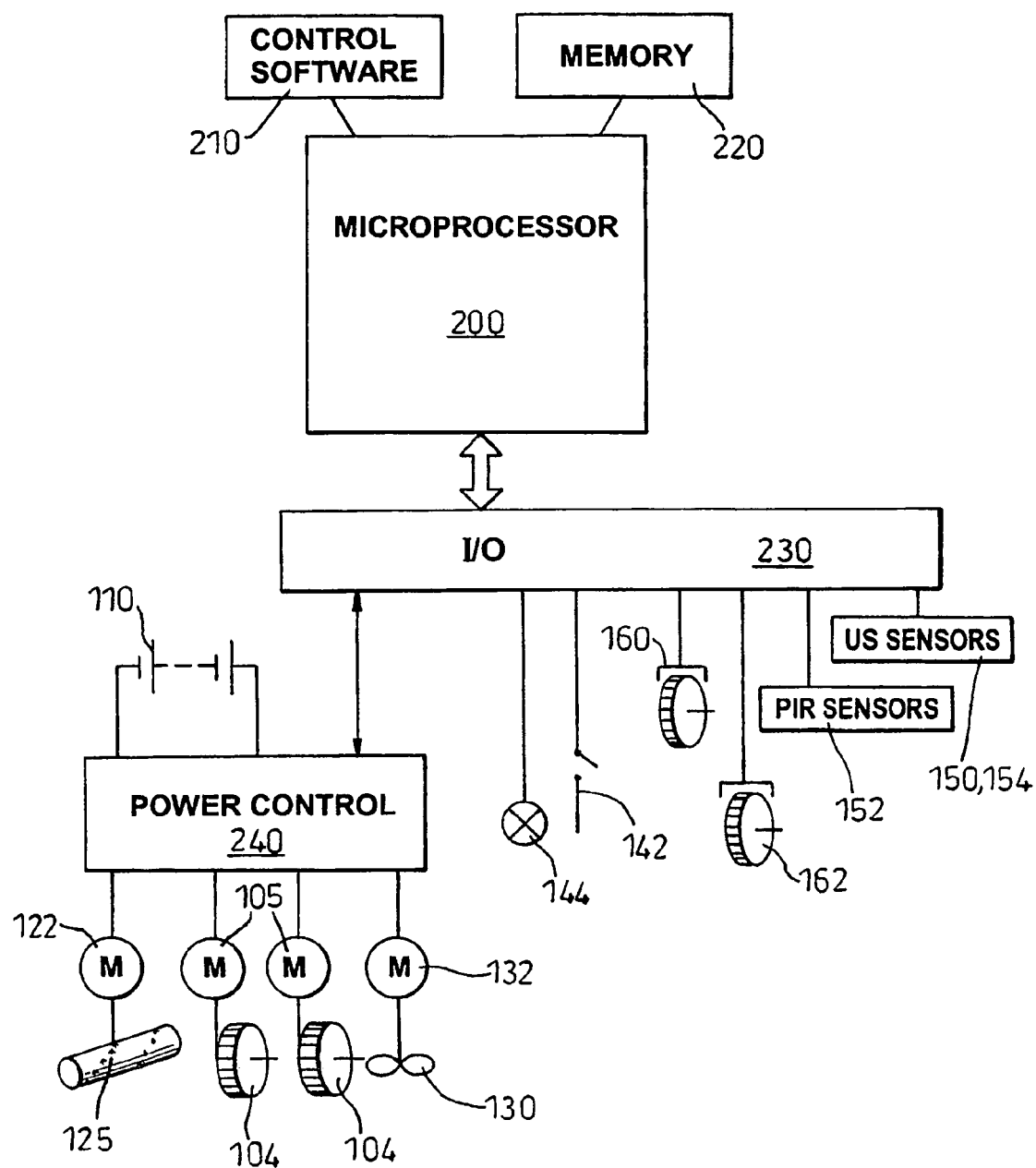
FIG. 2 shows the electrical systems in the machine of FIG. 1.

FIG. 2 shows, in schematic form, the electrical systems for the cleaner of FIG. 1. The navigation system comprises a microprocessor 200 which operates according to control software which is stored on a non-volatile memory 210, such as a ROM or FLASH ROM. Another memory 220 is used during normal operation of the machine to store data, such as the path data and a map of the working area, and other operating parameters. The navigation system receives inputs about the environment surrounding the machine from sensor array 150, 152, 154 and inputs about movement of the machine from odometry wheel movement sensors 160, 162. The navigation system also receives inputs from switches 142 on the user interface, such as start, pause, stop or a selection of operating speed or standard of required cleanliness. The navigation system provides a plurality of output control signals: signals for driving the traction motors 105 of the wheels 104, a signal for operating the suction motor 132 which drives the suction fan 130 and a signal for operating the motor 122 which drives the brush bar 125. It also provides outputs from illuminating indicator lamps 144 on the user interface 140. Power is supplied by rechargeable battery packs 110.

Navigation Method

Figure 3:
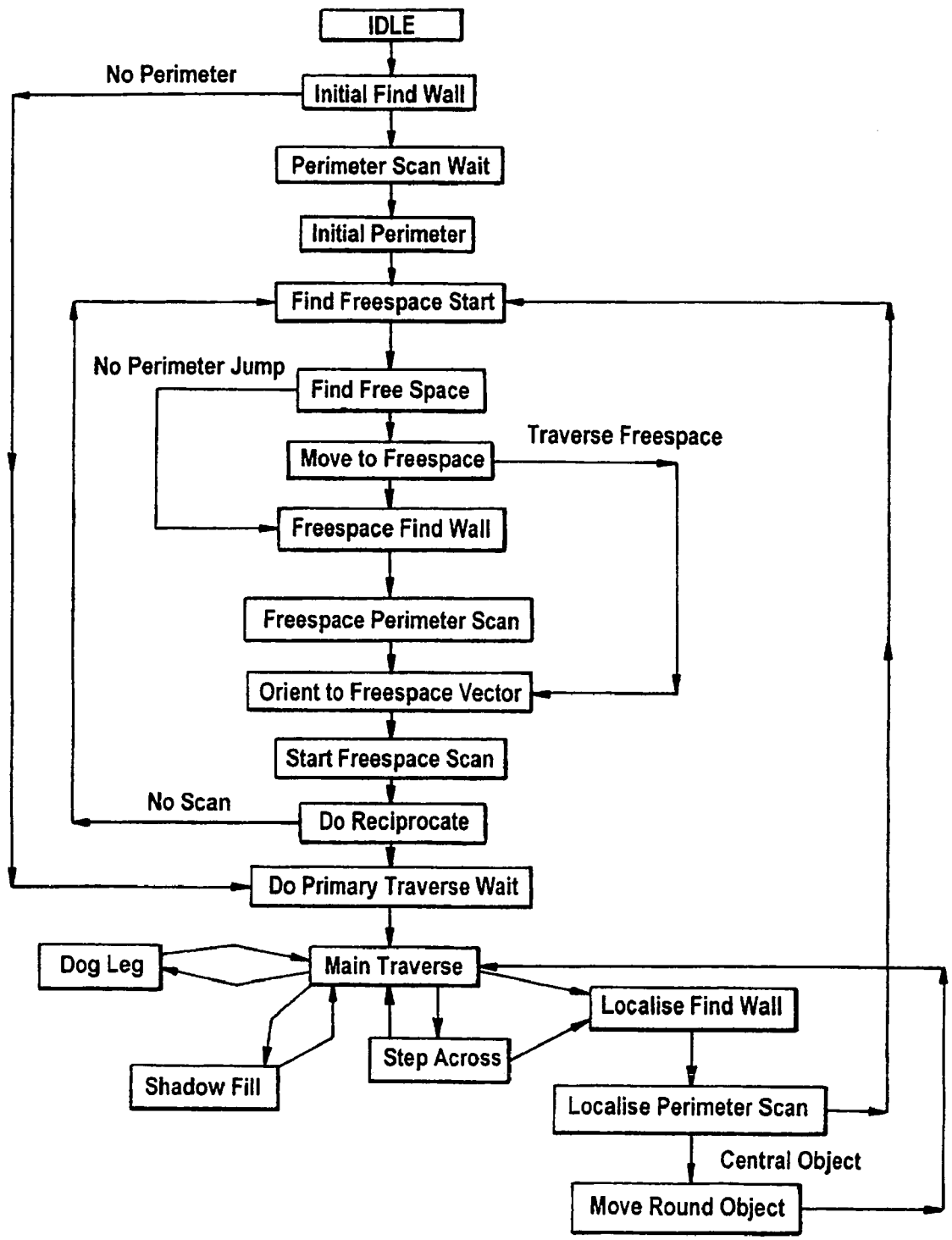
FIG. 3 shows the overall set of machine behaviours.
Figure 4:
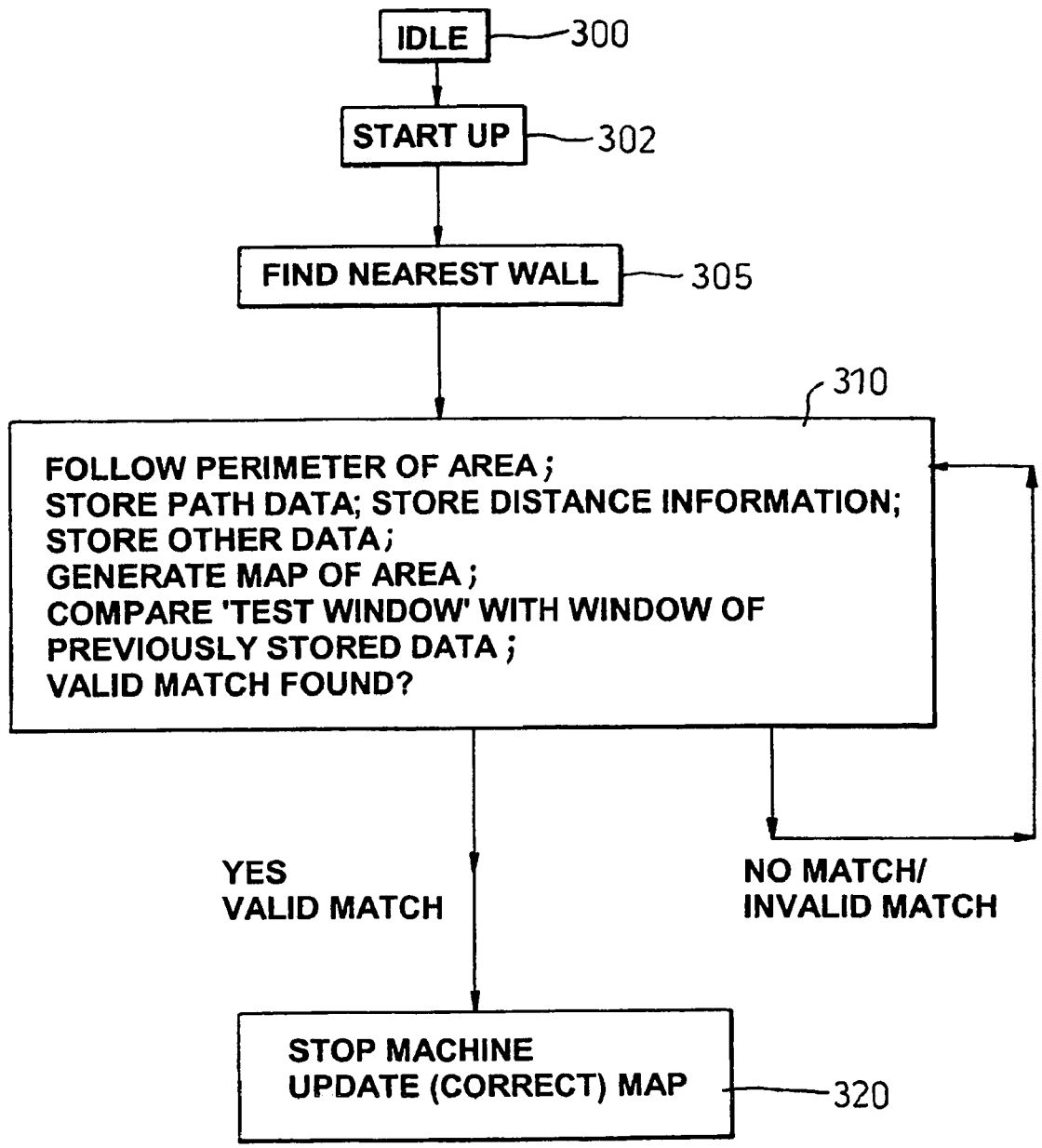
FIG. 4 shows the method for navigating the machine around the boundary of a working area.
Figure 5:
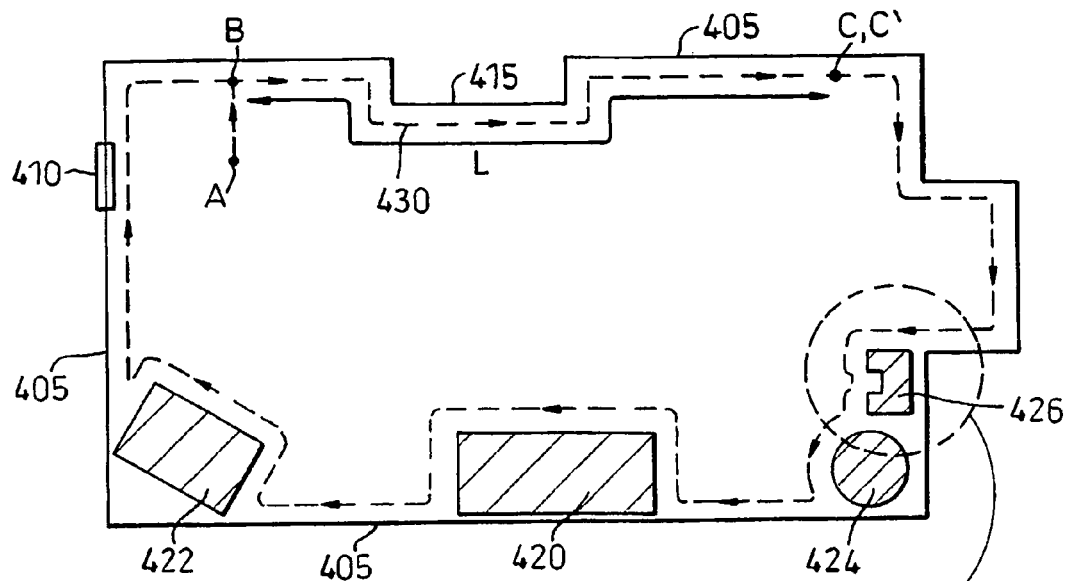
FIGS. 5 and 6 show the machine operating in an example room scenario.
Figure 6:
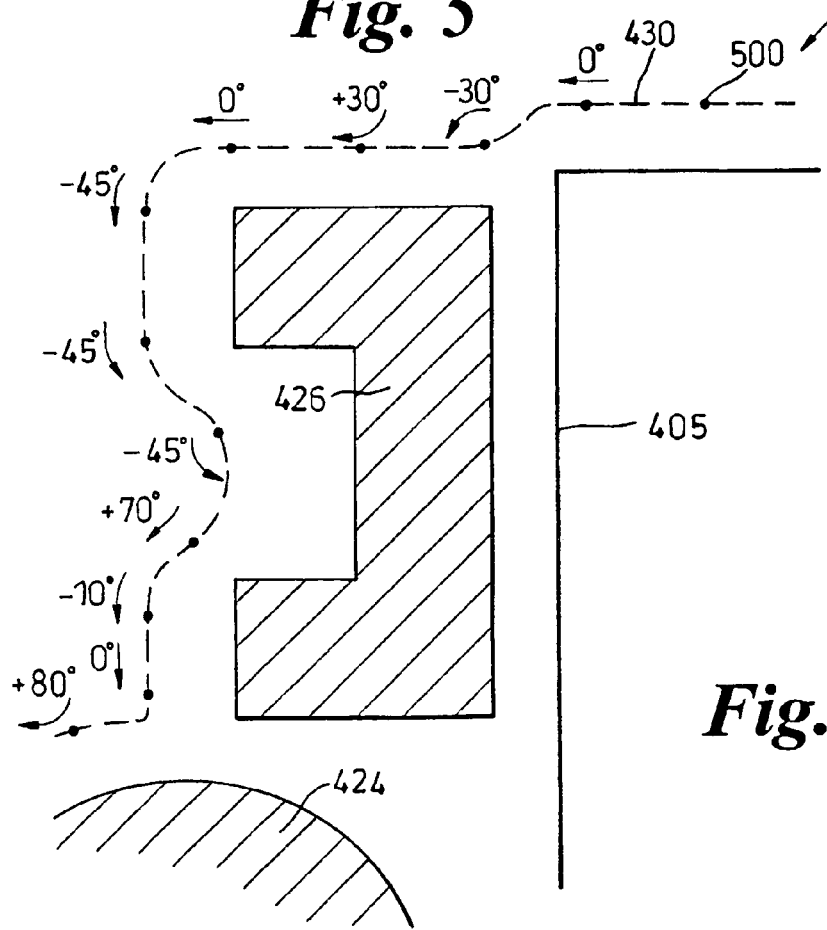
Figure 7:
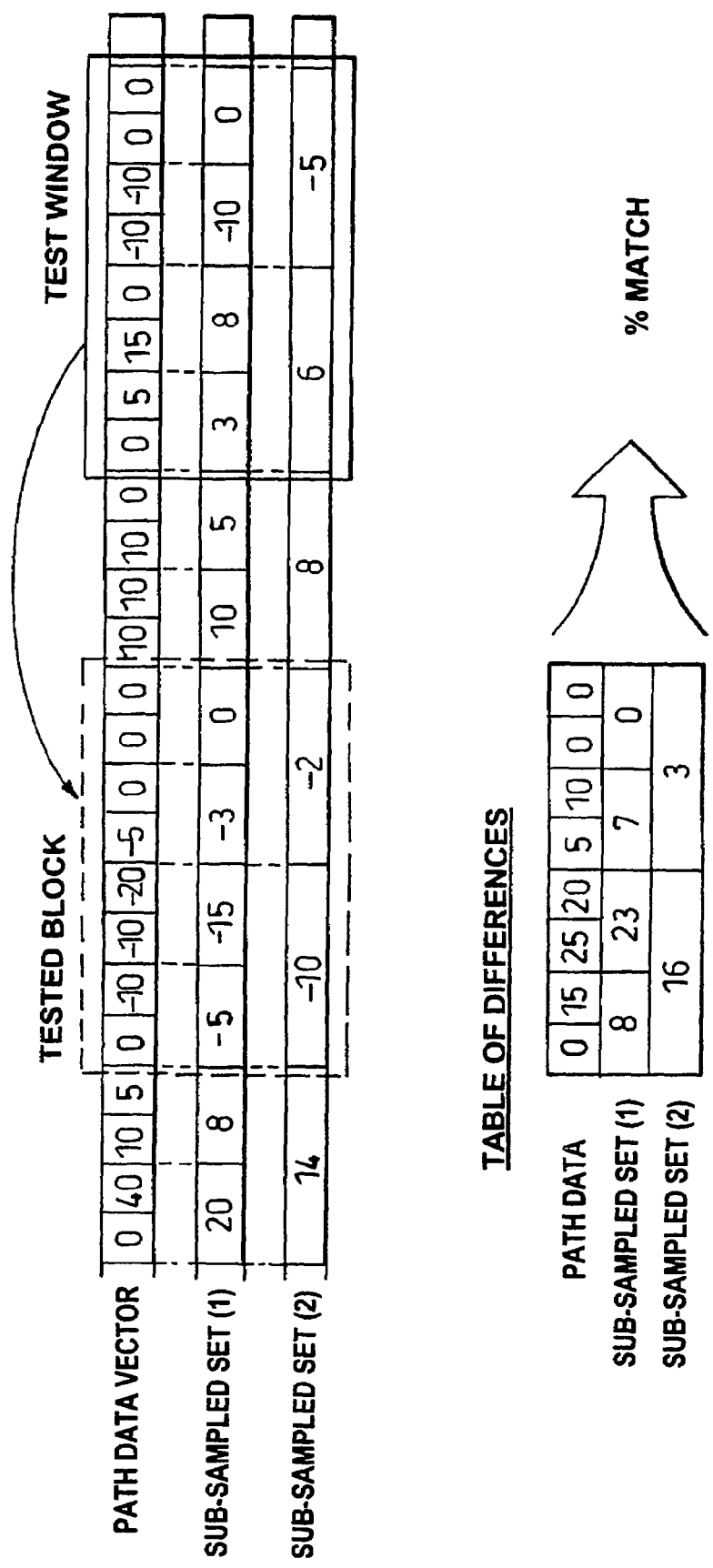
FIG. 7 shows the process for matching path sections.

The operation of the machine will now begin to be described with reference to FIGS. 3–7. FIG. 3 is a flow chart of the overall set of behaviours followed by the machine. FIG. 4 is a flow chart of the process for navigating around a boundary of the working area. FIGS. 5 and 6 show an example of a working area in a room of a house, the room having a boundary which is defined by walls 405, a doorway 410, a fire place 415 and articles of furniture 420–426 (e.g. sofa, chair) placed against the walls of the room. These figures also show an example path 430 taken by the machine. FIG. 7 illustrates the path matching process.

When the machine is first started it has no knowledge of the area in which it is positioned. Thus, the machine must first explore the area in which it is to work to acquire a knowledge of the area.

Boundary Scanning

The machine is left in the room by a user. Ideally the user is required to place the machine pointing towards an outer boundary of the room or with its left side against the boundary. The user can start the machine at any point on the boundary. In FIG. 4 the machine is shown starting at point A. The first action of the machine is to detect the closest wall 405 (step 305) and move towards it. The machine then aligns to the wall (point B) and starts the suction motor 132 and brush bar motor 122. It waits until the motors reach operating speed and then moves off. The machine then begins to navigate around the boundary of the room, continuously detecting the presence of the wall and maintaining the machine at a predetermined distance from the wall. The machine navigates around the obstacles 420-426 in the same manner as for the walls 405, maintaining the machine at a predetermined distance from the obstacles. The machine continuously records information about the path that it takes in following the boundary of the room. The machine derives information on the distance and direction of travel from the odometry wheel sensors 160, 162.

As the machine follows the boundary of an area, the navigation system samples, at regular distance intervals, the angular change in direction of the machine (compared with the direction at the previous sample). It is important to note that this information represents the path (or trajectory) of the machine rather than information about objects that it senses around it. The distance between. samples will depend, inter alia, on the environment where the machine is used, the processing power available, memory size, the matching criteria. At each sample period, the navigation system determines the angular change in the direction of the machine compared with the previous sample. The angular change is stored in the memory 220 as part of a vector of all sampled values. FIG. 6 shows part of the path 430 followed by the machine. At each sampling point 500 the corresponding arrow and angular value indicates the change compared with the previous sampling point 500.

Figure 8:
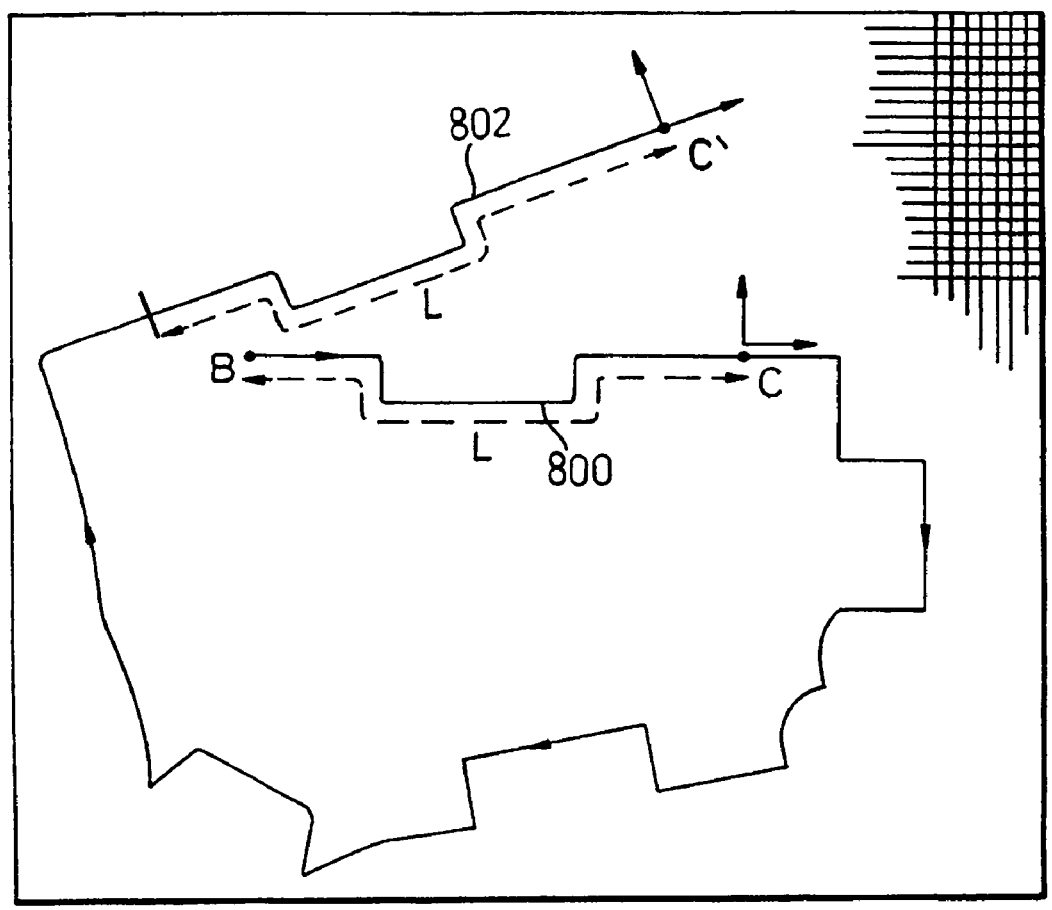
FIG. 8 shows the machine-generated map of the working area following an initial traverse of the boundary of the working area.

In addition to recording the angular direction changes at regular, fairly widely spaced apart intervals, the navigation system also plots, in detail, the path followed by the machine in order to construct a map of the working area. FIG. 8 shows an example of the map of the room shown in FIG. 4. Each point of the machine's path around the boundary is defined by a coordinate on the map. Also, as will be described later, the machine uses sensors on the left and right hand sides of the machine to detect the distance to the nearest obstacles on each side of the machine. This 'distance to obstacle' information is recorded on the map for points along the machine's path.

As soon as the machine has travelled a distance L, it begins to compare the last L metres worth of the angular path data with previous L metre blocks of path data to find a match and hence to establish whether the machine has returned to a previously visited position along the boundary. Once the machine has made one complete clock-wise trip around the boundary of the room, and arrived again at point B, the matching process should not yet have found a suitable path match, so the machine continues to follow the boundary. At point C' (i.e. point C on the second lap of the room) the machine recognises that it has returned to a previously visited position on the boundary of the room. This is because the matching process will have found a suitable match between the most recent L metres worth of path data and the initial L metres worth of path data stored by the machine. This completion point will always result in a L metre overlap of the boundary that is double covered. Once the start point has been detected the machine stops and shuts down the suction and brush bar motors.

The matching process works by comparing a block ('window') of the stored direction data with a previously stored block of direction data. This technique is often called a sliding window technique.

The angular change of direction data is processed by a sub-sampling process to derive three other sets of data, which are also stored in the path data vector. (Note, for simplicity only two sub-sampled sets of data are shown in FIG. 7.) Each sub-sampled set of data represents a coarser interpretation of the actual path travelled by the machine. Since even a good machine is likely to vary in the first and second attempts that it takes to traverse the same portion of boundary, these sub-sampled data sets provide useful information on the underlying direction changes which are likely to form a good match in the matching process.

For each level of sub-sampling, the most recent window of data is compared with earlier, equally sized, windows of data in the overall data vector. For each comparison, each element in the new and tested windows of data are compared. The overall difference between the two windows of data, at each sub-sampling level, is converted to a metric representative of the 'quality of match'. We favour using a percentage value, but other techniques can equally be used. The matching process has a threshold value for the 'quality of match' metric which indicates, from experience, a positive match between two sets of path data. For example, we have found a match of >98% is indicative of a positive match between two sets of path data which represent the same position in a room. A skilled person will appreciate that there are many refinements which can be made to this basic scheme and many other ways in which the path data can be compared.

The matching process allows the machine to establish when it has returned to a start position on the boundary. This is something that a machine must discover when it is set to work in an area of which it has no advance knowledge of the size, shape, layout etc.

While the machine is moving around the boundary it stores sections of path data from the boundary path as "markers". The use of markers will be described more fully below. They are a way of allowing the machine to quickly determine its position on the boundary. The number of markers that are stored around the boundary depends on the amount of processing power available in the matching engine of the machine—more markers requires more comparisons. If the machine can only store a limited number of markers, the navigation system can automatically expand the distance between the markers as the length of the perimeter increases.

The path length L required for matching, the distance between sampling points and the quality metric threshold indicative of a strong match are all dependent on the working area and conditions where the machine will be used. These can be readily determined by trial. In a domestic environment we have found that a distance L of 3.6 m, a distance between sampling points of 7.5 cm and markers positioned every 2 m around the boundary provides good results.

Boundary Map Correction

As described above, the initial exploration process involves the machine following the boundary for just over one full circuit, and storing the path that the machine follows. The machine determines that it has returned to the starting point on the boundary after an overlap distance. As shown in FIG. 8, the boundary map produced in this way is usually not closed, which means that the common start 800 and finish 802 path sections (which in the real world are the same, as identified by the path matching process) have different locations and orientations due to accumulated odometry errors. It is necessary to represent all path points on a single Cartesian co-ordinate system (frame), though the choice of frame is arbitrary. If we choose the frame to be that of the finish point of the robot, then the error in the path increases as we move backwards from the finish section, along the travelled path, towards the start point.

The map closure (correction) process progressively deforms the map as we travel from the end (no deformation) to the start (maximum deformation) such that the start segment maps onto the finish segment. This ensures that we have zeroed the error at the start point and have generally reduced the error elsewhere.

Figure 9:
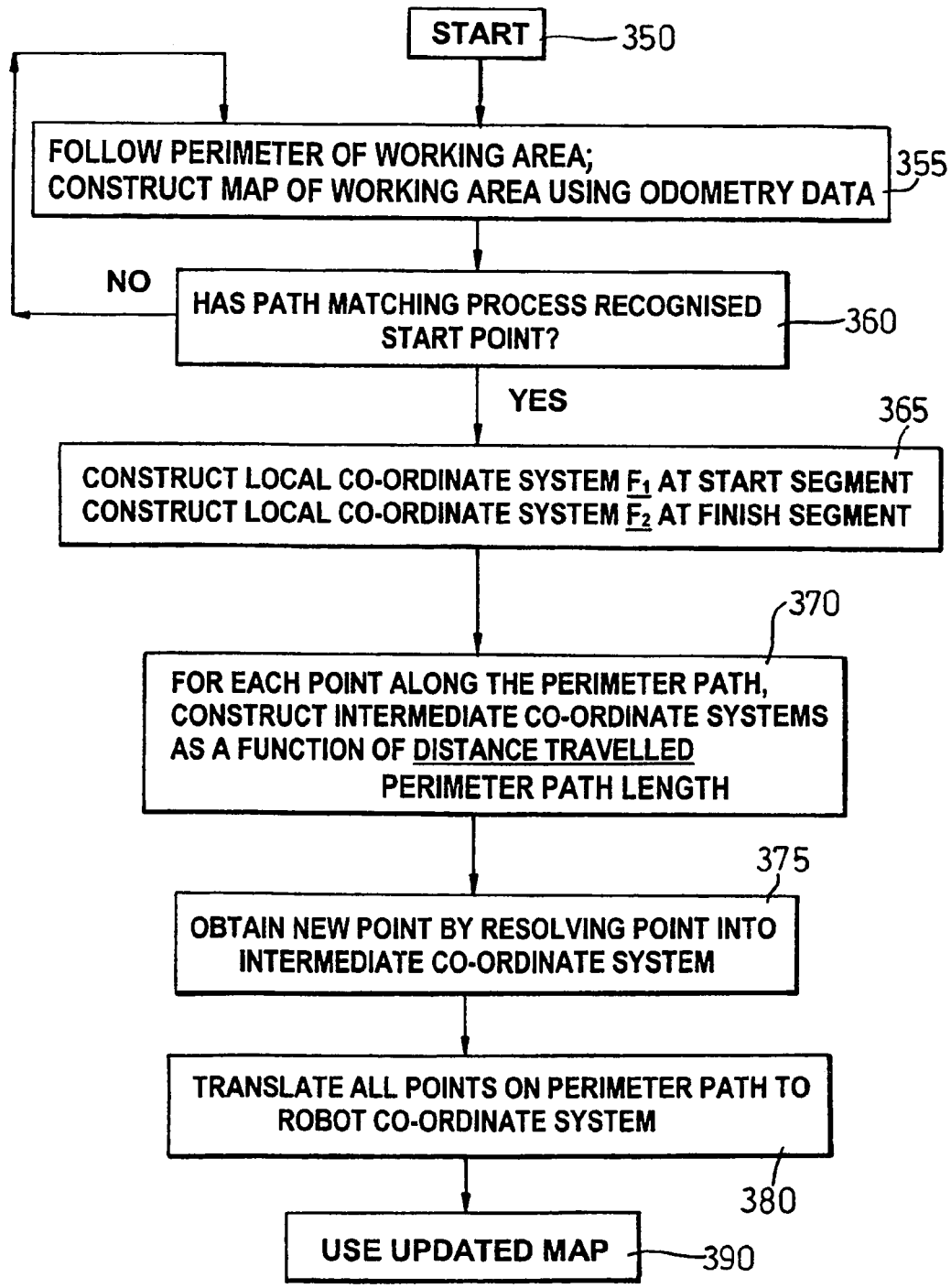
FIG. 9 shows the map correction process.

FIG. 9 shows the steps of the map correction process. The initial steps of the process 355, 360 are the boundary following method. We can set up two local Cartesian coordinate systems (local frames or views) $V_1$ and $V_2$ such that the their origins and x-axes are positioned and oriented relative to corresponding locations in the start and finish boundary map segments, respectively, which were identified by the path matching process.

Figure 10:
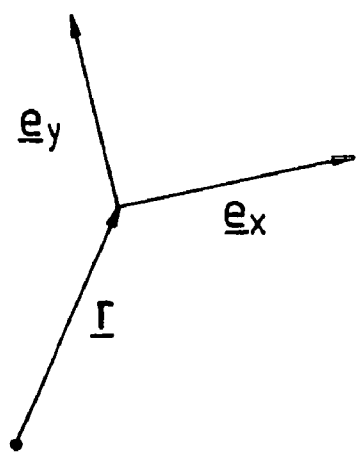
FIG. 10 shows the coordinate system used in the map correction process.

As shown in FIG. 10, a view is defined by three vectors, a position vector r for the origin, and unit vectors for the local x and y axes, $e_x$ and $e_y$.

The position of any point p in a view is given in vector notation by:

$$p'_x = (p-r) \cdot e_x, p'_y = (p-r) \cdot e_y$$

or equivalently in matrix notation:

$$p' = M(p-r) \text{ where } M = \begin{bmatrix} \langle e_x \rangle \\ \langle e_y \rangle \end{bmatrix}$$

In view $V_1$, the start of the boundary is at the origin and a tangent to the boundary at the start points along the x-axis. Similarly, in view $V_2$, the start of the overlapping segment is at the origin, and the tangent to the path at this point is along the x-axis. By "looking" at the start with $V_1$ and the finish with $V_2$, the projection of start and finish segments have the same position and orientation. For points P between the start and finish, we must use some intermediate view between $V_1$ and $V_2$. As a view is a linear operator, and as error accumulates as the robot travels on its path, a simple scheme is to linearly interpolate between the two as a function of the proportion of the total boundary length travelled.

$$V_i(\rho) = (1-\rho)V_1 + \rho V_2$$

and the position of any intermediate path point is given by:

$$p_P = V_i(\rho)p_\rho$$

The view which projects each point into the new map changes smoothly from the start view to the end view as we travel along the boundary path from start to finish.

Finally, to male the finish segment correspond to the segment in the robot co-ordinate system, a post-projection rotation and translation is applied (step 380).

An alternative way of considering the map correction is as follows. When the machine has completed a circuit of the area and the path matching process has determined that the machine has returned to a known position, it is possible to calculate the difference in distance and angle between the two points on the navigation system's map of the area which are known to be the same position. This total accumulated error can then be divided among the coordinates which have been recorded for that initial traverse of the area. In its simplest form, the error can be equally divided among all of the points in a linear manner (small portion of the error for the points near the start, larger portion for the points near the finish.) Once the machine has updated the map coordinates, it uses the updated map for the subsequent navigation of the area.

Figure 11:
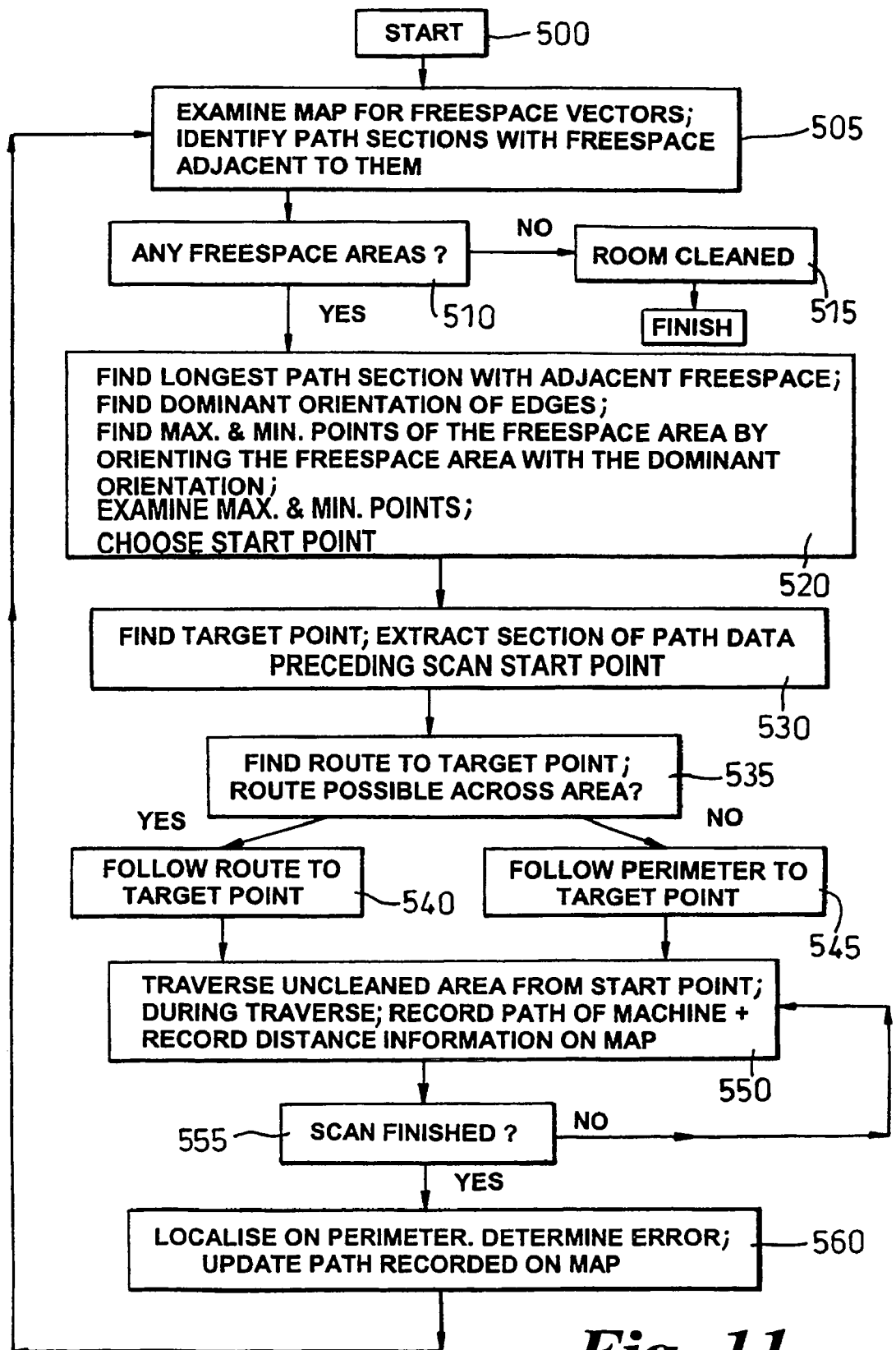
FIG. 11 shows the method for scanning the working area.

Once the machine has established a good map of the working area the machine then begins the task of cleaning the entire floor area, which is described in the flow chart of FIG. 11.

Figure 12:
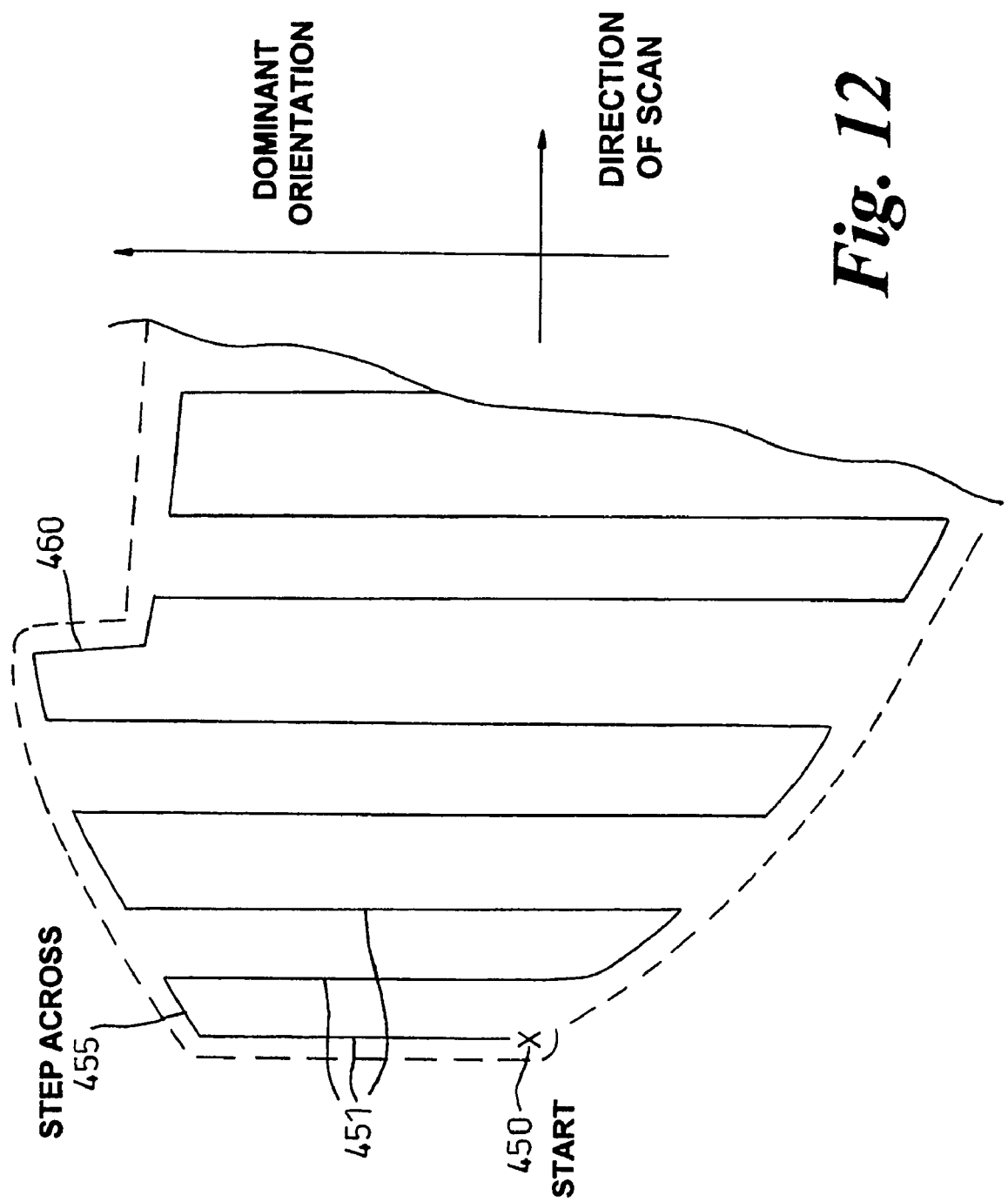
FIG. 12 shows a reciprocating scanning movement.

The basic technique that the machine uses to cover a floor area is a reciprocating scanning movement, as shown in FIG. 12. That is, from a start point 450, the machine follows a set of parallel straight line paths 451, each path 451 being followed by a step across movement 455 that positions the machine pointing back in the direction from which it has just come but translated one brush bar width across in the direction of the scan. The straight line path is maintained by monitoring the orientation of the machine and correcting the speeds of the left and right traction motors so as to maintain a straight line. The step across action can take place in multiple segments, as shown by action 460. This allows the machine to match the profile of the object that has impeded the straight trajectory. There are a number of movement sequences that are used to maximise the depth of the scan and these are detailed after this general description. Eventually the machine will no longer be able to continue scanning in the direction it has chosen. This will occur when there is no more space to move into or when there have been a number of short traverses.

For a simple room, the machine may be able to completely traverse the floor area with one reciprocating scanning movement. However, for most room layouts the combination of unusual room shape and objects placed within the room (particularly objects positioned away from the walls) will require two or more separate scanning movements.

Once the boundary map has been corrected the machine examines the shape of the room and looks for the most appropriate point to start the cleaning scan from. There are various ways of doing this.

Room Scanning

Figure 13:
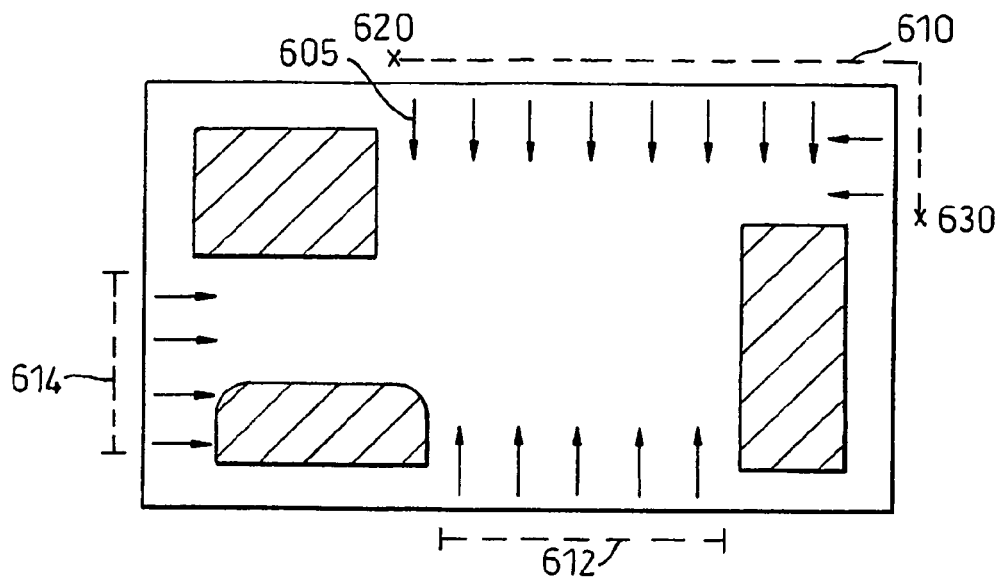
FIG. 13 shows the map of a room and free space areas.

A preferred way of scanning the room will now be described. Initially the machine looks for uncleaned regions that are adjacent to the boundary. As the machine travelled around the boundary of the area it also used the sensor or sensors on the sides of the machine to measure the distance to the nearest obstacles located to the sides of the machine and recorded that information on the map. Once the machine completes a lap of the boundary of the area it then processes the 'distance to obstacle' data to derive a free space vector. The free space vector (605, FIG. 13) represents the amount of uncleaned space in a direction from that point on the map. The free space will be the distance to an obstacle minus any distance that the machine has already covered during its path. The free space vectors are plotted on the map at regular points around the boundary path. Since the machine has not travelled through the centre of the area, and lacks any advance knowledge of the layout of the area, this is the best information that the machine has of the layout of the area within the boundary. When deciding where to begin scanning, the navigation system looks at where, on the map, the free space vectors are located (step 505, FIG. 11). The system looks for the longest length of boundary with free space vectors. An alternative criterion is for the system to choose the closest boundary section to the machine's current position which has free space located adjacent to it. Boundary sections with free space adjacent to them are located at 610, 612, 614. Having found the longest boundary with free space (section 610), the navigation system attempts to find the dominant edge orientation of this part of the area (step 520). In performing a reciprocating pattern, the machine is particularly prone to accumulating odometry errors at the places where it turns through 180 degrees. Thus, it is preferred to traverse an area in a manner which minimises the number of turns. We have found that the dominant edge orientation of an area has been found to be the best direction to traverse an area.

There are various ways in which the dominant edge orientation can be found. One way is to plot the direction (as an absolute angle) of each segment of the selected path section 610 on a histogram. One axis of the chart represents the absolute angle of the paths and the other axis represents the accumulated length of path segments at a particular angle. For a complicated path this could result in a lot of computation. The computation can be simplified by only recording a segment of the path as a different angle when its angular direction differs from an earlier part of the path by more than a particular angular range, e.g. ten degrees. If this simplification is followed, the plot at each angular value can be represented by a distribution curve. Segments which are separated by 180 degrees can be plotted at the same angular value on the bar chart since they are parallel to one another. This bar chart can be readily processed to derive the dominant direction of the area.

Figure 14:
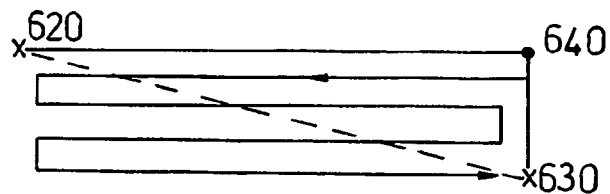
FIG. 14 shows one of the selected free space areas of the room.

Having identified the dominant direction, the navigation system isolates the area of the map in which the selected boundary path section lies, as shown in FIG. 14. The navigation system rotates the isolated part of the area until it is aligned in the dominant direction and then finds the extremities of this part of the area. The navigation system then selects one of the extremities as a start point for the scan.

Figure 15:
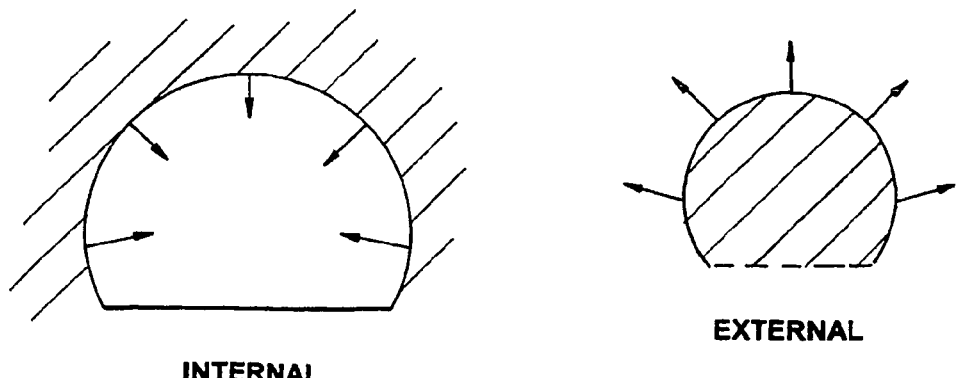
FIG. 15 shows types of free space areas which may exist within the room.

A further analysis is made of the selected part of the room area. This determines whether the free space is located inside or outside the boundary. FIG. 15 shows two types of area which can be encountered. An internal free space area is enclosed by the boundary section whereas an external area free space area surrounds the boundary section. The navigation system can determine the type of free space area by summing the angular change between each segment of the boundary section. An angular change sum of 360 degrees indicates an internal area whereas an angular sum of −360 degrees represents an external area.

There are some heuristics in selecting the start point. If the end points 620, 630 of a scan area are spaced apart from one another on the map by more than a predetermined distance then they are considered to represent an open area. If the free space area is an internal area, the navigation system will try not to choose one of these end points as a start point as this will tend to cause the machine to scan towards the boundary in a direction which is possibly away from other free space that could be cleaned. The navigation system attempts to select a start point located elsewhere on the boundary, i.e. bounded on both sides by other path segments of the selected path section. A start point of this type has been found to cause the machine to scan inwards into the area rather than outwards. When the machine scans inwards it can often clean other free space areas after the isolated area has been cleaned, which can reduce the overall number of separate scanning operations that are required to cover the room area. Also, if there is a choice of start point, the nearer start point to the current position of the machine is chosen, providing the machine is able to localise (reset odometry errors) before reaching the start point.

Figure 16:
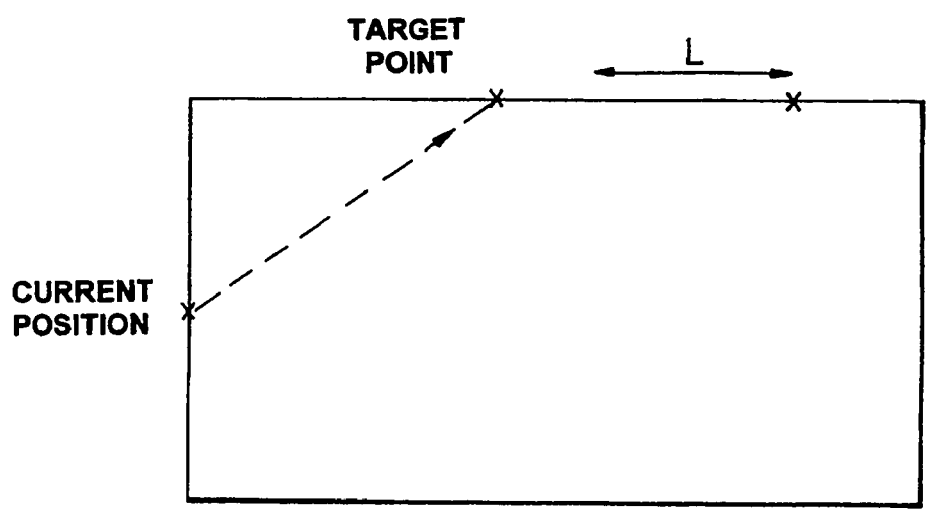
FIG. 16 shows a way of reaching scanning start points.

As shown in FIG. 16, once a start point on the map has been selected, an L meter section of the boundary path data preceding the desired scan start point is extracted from the memory (step 530). If necessary, the machine then selects a point further back along the boundary from the start of the extracted section and marks this as a target point. The machine then attempts to find a path across the room to this target point from its current location. It does this by searching the room map for places that it has previously visited it then plots a path over these spaces to the target point on the boundary. It then moves to the target point and follows the boundary until it matches the trajectory section for the start of the next cleaning scan. Matching of this segment of the boundary path data is carried out in the same way as that of matching to find the start position.

If it fails to find a route to the target point (step 545), either because the route was too risky or because it encountered an object on the way, then it moves onto the boundary. It moves round the boundary until it reaches one of the better free space points and starts a scan from there.

Once the machine reaches the scan start point it orients to the chosen scan direction (the dominant direction identified earlier) and proceeds to scan in a reciprocating manner into the uncleaned space (step 550). While the machine is moving in a straight line it is constantly checking to see if it has already visited the space it is on. Once it sees that it has run over a previously visited space by its own length then it stops and carries out a step across. Since this step across is in open space it is a single segment step across. This cleaning scan continues until either it is blocked or there have been a small number of short traverses or the whole of the previous traverse was on space that had been visited previously. During the scanning process, the navigation system records the travelled path on the map, such that the machine knows which positions of the map have been cleaned, and also continues to record the distance to the nearest obstacle seen by the machine's sensors on the map. After each scanning operation the machine processes the distance information recorded on the map, taking account of the areas already cleaned by the machine, to calculate a free space vector. The free space vectors are plotted on the map and can then be used by the navigation system to decide the next area where scanning should occur.

A period of reciprocating scanning will induce odometry errors. Therefore, between each period of scanning, the machine looks for the boundary of the area and follows the boundary of the area (step 560). As the machine travels around the boundary of the area it stores the path travelled by the machine. The machine travels for a distance of at least the minimum distance necessary for finding a match, i.e. L metres. The matching process attempts to match the new block of boundary path data with the boundary path data that was originally stored in the memory. If a block of path data matches positively then the machine knows it has returned to a known position on the map and can thus rest the odometry error to zero. If the matching process fails to find a good match then the machine will continue on the boundary until it should have reached one of the marker positions. If this also fails then it assumes that it is on a central object.

If the machine correctly recognised a position on the boundary then it realigns the just completed traverse scan and the boundary section onto the free space map, based on the measured error between the machine's perceived position on the map and the actual position on the map. The navigation system then finds the next largest uncleaned part of the area (step 505).

The machine then repeats the search for freespace and the moves to them until all the space that can be identified on the map has been completed (steps 510, 515).

During the matching process, in addition to looking for a strong match between blocks of data, the matching process also makes a number of safety checks. It makes sure that the orientation of the matching section is roughly the same as the extracted section and that they both roughly lie in the same part of the internal map. The odometry error gradually increases with distance travelled. The matching process sets an event horizon, i.e. a boundary for possible positions on the map where, due to odometry error, a match may occur. Any matches which correspond to positions in the room which are not, due to the size of the odometry error, possible positions for the machine are discounted.

Central Objects

Figure 17:
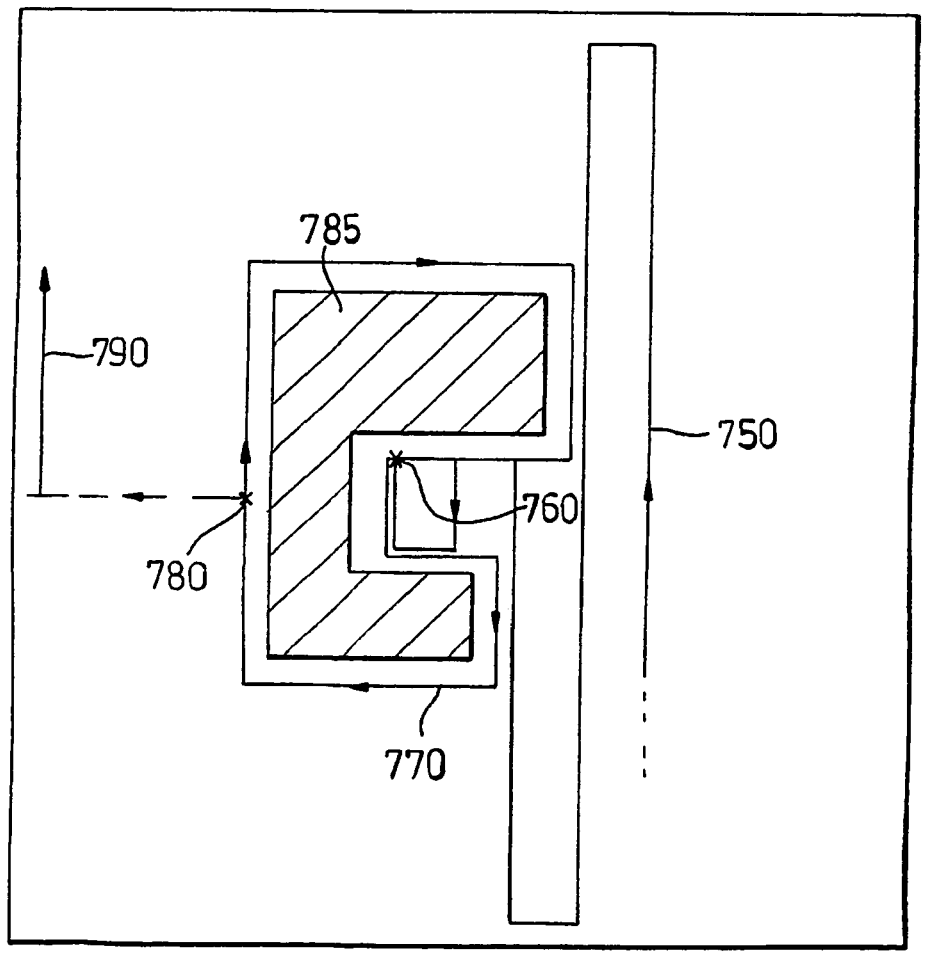
FIG. 17 shows a way of coping with centrally positioned objects.

A complex area is likely to include obstacles which are located away from the boundary of the area, such as a coffee table. FIG. 17 shows a strategy for coping with central objects. The machine performs a scanning operation 750 and eventually reaches a point at 760 where it can no longer continue the scanning movement. The machine then proceeds to follow the edge of the object 785, cleaning around the edge of the object. After travelling a distance of L metres around the object 785 the machine will attempt to match the last L metre path section with the path recorded around the boundary of the room. This should fail to give a suitable match. Thus, the machine recognises that it is following the edge of an object. The machine jumps off of the object at position 780, on the remote side of the object in the direction of the scan, and follows the boundary of the room 790 until it can match the travelled path with the previously stored boundary path data. At this point the navigation system can reset any odometry error and accurately place the position of the object 785. Note, in following the edge of a central object, the machine may travel around the object several times until it has travelled a distance of L metres.

Scanning Behaviours

FIGS. 18–20 show some of the ways in which the machine operates during a scanning operation. As previously described with reference to FIG. 12, the scanning operation comprises a series of parallel straight line paths which are offset from one another by a distance W, which will usually be equal to the width of the cleaning head of the machine. However, irregular boundary shapes do not always permit the machine to follow a regular scanning pattern. FIG. 18 shows a segmented step across where the machine follows the boundary 800 of the room in segments 804, 806 until it has travelled the total required step across distance W. At each step the machine rotates until it sees a clear path ahead and travels forward until it needs to turn. The step across distance W can be determined from trigonometry of the travelled paths 804, 806. A complex step across movement may comprise more segments than are shown here. This movement allows the machine to properly cover the floor surface and to continue the scanning movement at the regular width W.

FIGS. 19 and 20 show other situations where the boundary prevents the machine from performing a regular step across movement. In FIG. 19 the machine reaches the end of movement 810 and follows the wall along path 812 until it can step across at 813 to the proper scan separation distance W. FIG. 20 shows a similar scenario where the machine must travel back on itself along path 822 until it can travel across along path 823 and continue the scanning movement at the regular width W. In these movements the machine monitors, during path 810, 820 the distance on its right hand side to the wall/obstacles to determine whether the machine will be able to step across to continue its scanning movement.

Markers

Markers are L metre sections of path data which can be used at various times by the navigation system to quickly determine the current position on the boundary. They are particularly useful in allowing the machine to cope with the kinds of errors that can occur when the machine is forced to folow a different path around the boundary, e.g. because something has been moved. If the machine is travelling around the boundary looking for a particular L metre section of the path but fails to find it, it will usually find the marker positioned after that particular section of required boundary and thus allow the machine to quickly recognise the error. Markers are also useful when the machine attempts to travel across a room area to reach a start point for a scan but misses it for some reason. This may occur if the machine does not properly reach the target point before the L metre section of boundary preceding the start point (see FIG. 16). Should the machine not find the start point, it follows the boundary of the area and should find the next marker on the boundary. Upon finding the marker the machine can recognise its error and try again.

Alternatives

The described method of recognising a previously visited position in an area by matching travelled path sections is dependent on several factors. Firstly, the navigation system should be able to cause the machine to travel in a closely similar manner when negotiating the same boundary on different occasions. The value of the 'quality of match' threshold and the process of sub-sampling path data so that the matching process considers the underlying path rather than the detailed path does allow for some variation between travelled paths while still allowing a successful match. Secondly, the matching process is dependent on the L metre path that is used during the matching process being unique to a position in the room. In rooms that possess one or more lines of symmetry, it is possible for the L metre path to be common to two or more positions within the room. Obviously, a truly rectangular room with no other obstacles on the boundary would cause a problem. The system can be made more robust in several ways.

Firstly, the length of the path used in the matching process can be increased until it does represent a unique position in the room. This can be performed automatically as part of the navigation method. Should the machine travel for more than a predetermined time period without finding a match, the navigation system can automatically increase the length of the matching window.

Secondly, the path data can be supplemented by other information gathered by the machine during a traverse of the area. This additional information can be absolute direction information obtained from an on-board compass, information about the direction, intensity and/or colour of the light field around the machine obtained from on-board light detectors or information about the distance of near or far objects from the machine detected by on-board distance sensors. In each case, this additional information is recorded against positions on the travelled path.

The map correction process described above applies a linear correction to the travelled path. In an alternative embodiment, the accumulated error can be divided among the set of coordinates in a more complex manner. For example, if the machine is aware that wheel slippage occurred half way around the traverse of the room boundary, it can distribute more (or all) of the accumulated error to the last half of the path coordinates.

The above method describes the machine following a clockwise path around an area. The machine may equally take an anti-clockwise path around the area during its initial lap of the boundary of the area. Also, in following the boundary to reach a start position for area scanning, the machine may follow the boundary in a clockwise or anti-clockwise direction.

In performing the clearing method, it is preferred that the cleaning machine steps across by substantially the width of the cleaner head on the cleaner so that the cleaning machine covers all of the floor surface in the minimum amount of time. However, the distance by which the cleaning machine steps inwardly or outwardly can have other values. For example, by stepping by only a fraction of the width of the cleaner head, such as one half of the width, the cleaning machine overlaps with a previous traverse of the room which is desirable if a user requires a particularly thorough cleaning of the floor. The step distance can be chosen by the user. There are various ways in which the user can choose the step distance: the user can be presented with a plurality of buttons or a control that specifies the step distances, or controls having symbols or descriptions indicative of the effect of the cleaner operating at the step distances, such as "normal cleaning", "thorough cleaning". The buttons can be incorporated in the user panel (140, FIG. 1), a remote control or both of these.

The invention claimed is:

1. An autonomous machine comprising:
   a driving mechanism for moving the machine along a surface of an area, and
   a navigation system, comprising a memory element, for navigating the machine around the area,
   the navigation system comprising:
   a boundary following unit causing the machine to follow a boundary of the area and storing path information taken at regular intervals spaced by an equal predetermined distance from one another on the path travelled by the machine as the machine follows the boundary; and
   a comparator determining when the machine has returned to a previously visited position in the area, the comparator being configured to compare the latest section of the path travelled by the machine with information representing a section of the path previously stored in the memory, and deciding when the new path information and previously stored path information are substantially the same.

2. An autonomous machine according to claim 1, wherein the path information is representative of the change in direction of the machine as the machine follows the boundary of the area.

3. An autonomous machine according to claim 2, wherein the path information indicates the relative change in direction of the machine compared to a previous point at which path information was stored.

4. An autonomous machine according to claim 1, wherein the navigation system also comprises a sensor sensing another parameter and storing this other parameter in the memory element along with the path information as the machine follows the boundary of the area.

5. An autonomous machine according to claim 4, wherein the comparator also uses the other parameter to determine when the machine has returned to a previously visited position in the area.

6. An autonomous machine according to claim 4 or 5, wherein the other parameter is the absolute direction of the machine.

7. An autonomous machine according to claim 4 or 5, wherein the other parameter is received light level or distance information.

8. An autonomous machine according to claim 1, wherein, if the comparator fails to find a match between the new path information and previously stored path information, the comparator is configured to increase the length of the path section used by the comparator.

9. An autonomous machine according to claim 1, wherein the navigation system is configured to travel around the boundary of the area and the condition of new path information being substantially the same as previously stored information is used to indicate that the machine has completed a traverse of the boundary of the area.

10. An autonomous machine according to claim 1, wherein the navigation system is configured to construct a map of the area and to add the path information to the map.

11. An autonomous machine according to claim 10, wherein, on determining that the machine has returned to a previously visited position on the boundary, the navigation system corrects the map.

12. An autonomous machine according to claim 10 or 11, wherein the navigation system is configured to cause the machine to follow the boundary of the area after a period of operating away from the boundary, the comparator being used to compare new path information from the path around the boundary with previously stored path information to decide when the two sets of path information are substantially the same and, upon detecting a match, to retrieve the position on the map corresponding to the matched path information.

13. An autonomous machine according to claim 12, wherein the navigation system is also configured to update, on the map, the path travelled by the machine during the period of operating away from the boundary based on the error between an estimate by the navigation system of the current position and the position which is retrieved from the map.

14. An autonomous machine according to claim 10 or 11, wherein the navigation system uses the recognition of a previously visited location to update the position of the machine on the map.

15. An autonomous machine according to claim 10 or 11, wherein the navigation system is configured so that, once the map has been constructed, the navigation system selects a starting point on the boundary from which to work in the area; extracts the section of path information on the boundary preceding the selected starting point; and causes the machine to travel along the boundary towards the starting point and to use the comparator to compare new path information, as the machine follows the boundary, with the extracted section of path information so as to find the starting point.

16. An autonomous machine according to claim 1, further comprising a deriving unit deriving odometry data, wherein the path information is derived from the odometry data.

17. An autonomous machine according to claim 16, wherein the comparator comprises:

an indicating unit maintaining an indication of the reliability of the new path information as the machine travels around the area, the reliability decreasing with the distance travelled by the machine since the last reset;

and wherein the comparator is configured to use the indication in comparing new path information with stored path information.

18. An autonomous machine, comprising:

a driving mechanism for moving the machine along a surface of an area, and a navigation system, comprising a memory element, for navigating the machine around the area, the navigation system comprising:

a boundary following unit causing the machine to follow a boundary of the area and storing path information on the path travelled by the machine as the machine follows the boundary; and a comparator determining when the machine has returned to a previously visited position in the area, the comparator being configured to compare the latest section of the path travelled by the machine with information representing a section of the path previously stored in the memory, and deciding when the new path information and previously stored path information are substantially the same, wherein the navigation system is configured to derive, from the stored path information, a second set of path information which is a less detailed representation of the travelled path.

19. An autonomous machine according to claim 18, wherein the comparator is configured to use the second set of path information in deciding whether the new path information and previously stored path information are substantially the same.

20. A method of controlling an autonomous machine comprising:

causing the machine to follow a boundary of an area, storing path information taken at regular intervals along the boundary spaced by an equal predetermined distance from one another in a memory, the path information relating to a path travelled by the machine as the machine follows the boundary;

determining when the machine has returned to a previously visited position in the area by comparing the latest section of the path travelled by the machine with information representing a section of the path previously stored in the memory, and deciding when the new path information and previously stored path information are substantially the same.

21. A computer readable medium containing program instruction for:

causing a machine to follow a boundary of an area, storing path information on a path traveled by the machine taken at regular intervals along the path spaced by an equal predetermined distance from one another as the machine follows the boundary;

determining when the machine has returned to a previously visited position in the area by comparing the latest section of the path traveled by the machine with information representing a section of the path previously stored in a memory, and deciding when the new path information and previously stored path information are substantially the same.

* * * * *